(No Model.)
A. C. ROSENCRANZ.
COTTON SCRAPER.
No. 568,280. Patented Sept. 22, 1896.
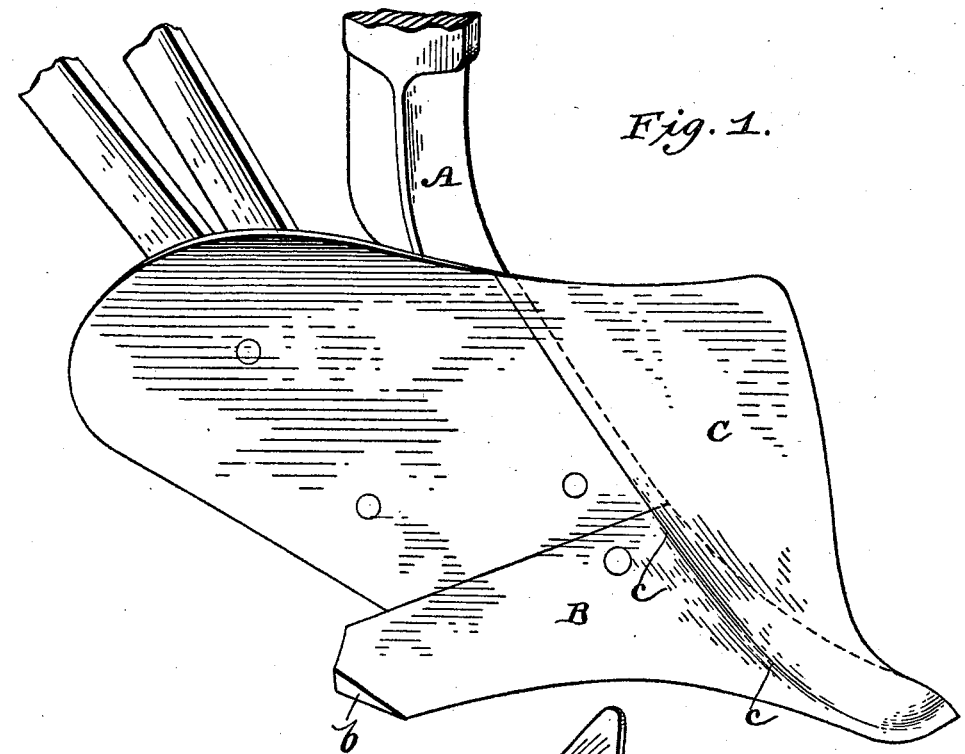
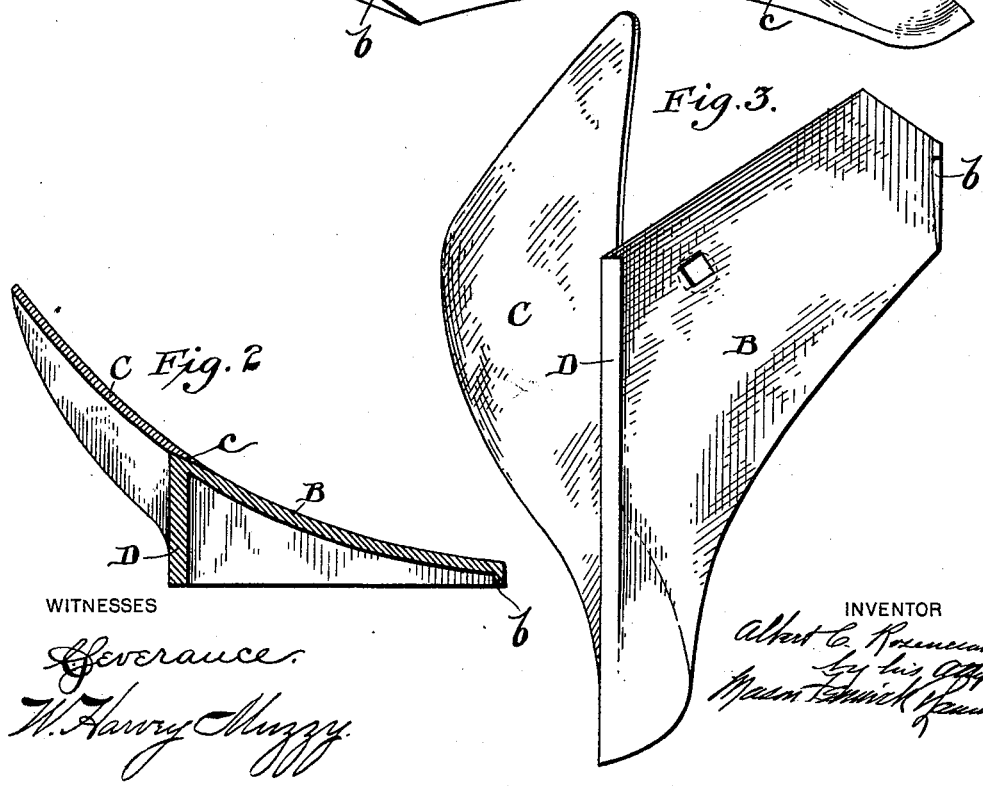
WITNESSES
INVENTOR

UNITED STATES PATENT OFFICE.

ALBERT C. ROSENCRANZ, OF EVANSVILLE, INDIANA, ASSIGNOR TO THE HEILMAN PLOW COMPANY, OF SAME PLACE.

COTTON-SCRAPER.

SPECIFICATION forming part of Letters Patent No. 568,280, dated September 22, 1896.

Application filed March 6, 1896. Serial No. 582,107. (No model.)

*To all whom it may concern:*

Be it known that I, ALBERT C. ROSENCRANZ, a citizen of the United States, residing at Evansville, in the county of Vanderburg and State of Indiana, have invented certain new and useful Improvements in Cotton-Scrapers; and I do hereby declare the following to be a full, clear, and exact description of the invention, such as will enable others skilled in the art to which it appertains to make and use the same.

My invention relates to improvements in cotton-scrapers; and it consists of a share-blade provided at its outer end with a downwardly-projecting guide or runner and a wing or scraper-blade extending up from the left of the share to act as a moldboard, the joint between the wing and the share being such as to present a continuous smooth upper surface.

It also consists of certain other novel constructions, combinations, and arrangements of parts, all of which will be hereinafter more particularly set forth and claimed.

In the accompanying drawings, forming part of this specification, Figure 1 represents a perspective view of a cotton-scraper embodying my invention, and Fig. 2 represents a detail transverse section through my improved cotton-scraper.

A in the drawings represents the plow-standard; B, the share; C, the wing or scraper-blade, and D the landside.

The inner edge of the share is turned down approximately at right angles to form the landside. This landside gradually decreases in depth toward the point where it is flattened out to present a smooth surface even with the bottom of the point. The outer edge of the share is also turned down at right angles to form a guide or runner $b$ parallel with the landside, and which is adapted to enter the soil and prevent lateral slipping of the scraper and hold it firmly to its work. The wing or scraper-blade C is lapped over the inner edge of the share at $c\ c$ and welded thereto, being ground down on its upper surface to present a smooth unbroken continuation of the share. The forward welded portion of the share and scraper-blade is formed into a wedge-shaped point that terminates at the left edge of the landside. The share is attached to the standard in the usual manner.

The guide $b$ assists the plow in the work of scraping the sides of the cotton-plant rows or ridges by increasing its steadiness and preventing any sudden shearing away from its work.

By terminating the point on a line with the left edge of the landside I avoid removing the edge of the furrow against which the landside presses to resist the pressure of the soil against the share and scraper-wing.

It will be observed that the cutting edge of the scraper-wing does not extend altogether out to the point, but commences some distance to the rear of the same and extends upward, backward, and outward, thus leaving enough soil to form a firm bearing for the landside and giving a shearing cut close up to the plant without disturbing the roots or the soil immediately around the plant. After the weeds and part of the surface-soil are cut they do not meet with any retarding joint or obstruction on the share or wing, but are turned by the wing and deposited in the furrow.

The guide or runner aids to steady the scraper in its forward movement, as well as to guard against lateral movement by offering a point of resistance to the pressure coming from the land extension and to the inclination of the heel to dip into the ground when the scraper-edge receives extra pressure from roots, &c.

By extending the edge of the wing down over the upper edge of the share and welding it thereto and reducing by grinding or otherwise, I secure not only a smooth, even joint, but materially strengthen the scraper or wing and prevent it from being broken or bent out of shape by any violent contact with a stump or other obstruction.

Having now described my invention, what I claim as new, and desire to secure by Letters Patent, is—

1. In a cotton-scraper, the combination of a share-blade provided at its outer end with a downwardly-projecting runner, and a scraper-wing extending up from the left of the share to act as a moldboard; the joint between the wing and the share being such as to present a continuous smooth upper surface, substantially as described.

2. In a cotton-scraper, the combination of a share-blade turned downward at its inner edge to form a landside, and a scraper-wing extending up from the left of the share to act as a cutter and moldboard; the scraper being lapped over the share and welded and ground to form a smooth continuation of the share, substantially as described.

3. In a cotton-scraper, the combination of a share-blade turned downward at its inner edge to form a landside of gradually-decreasing depth toward the point, and a scraper-wing attached to the left edge of the share over the landside from the point to the rear and extending to the left of the landside the whole length except a short portion near the point of the scraper, substantially as described.

4. In a cotton-scraper, the combination of a share-blade provided at its outer edge with a downwardly-extending runner and at its inner edge with a landside, and a scraper-wing extending up from the left of the share to act as a cutter, and moldboard; the joint between the wing and the moldboard being such as to present a continuous smooth upper surface, substantially as described.

In testimony whereof I hereunto affix my signature in presence of two witnesses.

ALBERT C. ROSENCRANZ.

Witnesses:
GUSTAV SCHAUER,
FRANK HORNBROOK.